(12) United States Patent  
Matano et al.

(10) Patent No.: US 8,388,798 B2  
(45) Date of Patent: Mar. 5, 2013

(54) PRESSURE-SENSITIVE ADHESIVE FOR APPLYING OPTICALLY FUNCTIONAL FILM, OPTICALLY FUNCTIONAL FILM AND PRODUCTION PROCESS FOR THE SAME

(75) Inventors: Tadashi Matano, Chiba (JP); Koichi Nagamoto, Saitama (JP); Yasuaki Aso, Tokyo (JP); Kentaro Kusama, Saitama (JP)

(73) Assignee: Lintec Corporation, Tokyo (JP)

( * ) Notice: Subject to any disclaimer, the term of this patent is extended or adjusted under 35 U.S.C. 154(b) by 655 days.

(21) Appl. No.: 11/746,830

(22) Filed: May 10, 2007

(65) Prior Publication Data

US 2007/0267133 A1 Nov. 22, 2007

(30) Foreign Application Priority Data

May 19, 2006 (JP) ................. 2006-140332  
Jul. 26, 2006 (JP) ................. 2006-203589

(51) Int. Cl.  
*B32B 37/00* (2006.01)

(52) U.S. Cl. ....... 156/325; 156/272.2; 528/44; 524/556; 524/560

(58) Field of Classification Search .............. 156/325, 156/272.8; 428/343; 525/54.2  
See application file for complete search history.

(56) References Cited

U.S. PATENT DOCUMENTS

| | | | | |
|---|---|---|---|---|
| 5,994,022 A | * | 11/1999 | Tanabe et al. | 430/170 |
| 5,997,968 A | * | 12/1999 | Dries et al. | 428/35.7 |
| 6,524,701 B1 | * | 2/2003 | Kondo et al. | 428/355 RA |
| 6,841,587 B2 | * | 1/2005 | Yamamoto | 522/39 |
| 2004/0239850 A1 | * | 12/2004 | Kim | 349/117 |
| 2006/0162857 A1 | | 7/2006 | Nagamoto et al. | |
| 2006/0223938 A1 | | 10/2006 | Nagamoto et al. | |
| 2006/0292314 A1 | * | 12/2006 | Yamada et al. | 428/1.31 |
| 2009/0062467 A1 | * | 3/2009 | Arai et al. | 525/54.2 |

FOREIGN PATENT DOCUMENTS

| | | | |
|---|---|---|---|
| CN | 1566244 | | 1/1995 |
| JP | 09159823 A | * | 6/1997 |
| JP | 10176157 A | * | 6/1998 |
| JP | 2000313871 A | * | 11/2000 |
| JP | 2004086231 A | * | 3/2004 |
| JP | 2006235568 A | * | 9/2006 |
| SU | 1049509 A | * | 10/1983 |

* cited by examiner

*Primary Examiner* — Philip Tucker  
*Assistant Examiner* — Vicki Wu  
(74) *Attorney, Agent, or Firm* — Oblon, Spivak, McClelland, Maier & Neustadt, L.L.P.

(57) ABSTRACT

A pressure-sensitive adhesive containing a pressure-sensitive adhesive resin and fine particles having an average particle diameter of 0.1 to 20 μm. The pressure-sensitive adhesive has a storage elastic modulus (G') at 23° C. of 0.3 to 15 MPa, and a haze value that is 5% or more.

23 Claims, 1 Drawing Sheet

PRESSURE-SENSITIVE ADHESIVE FOR APPLYING OPTICALLY FUNCTIONAL FILM, OPTICALLY FUNCTIONAL FILM AND PRODUCTION PROCESS FOR THE SAME

BACKGROUND OF THE INVENTION

1. Field of the Invention

The present invention relates to a pressure-sensitive adhesive for applying an optically functional film, an optically functional film and a production process for the same.

2. Description of the Related Art

Liquid crystal display panels have become rapidly widespread as a display device in place of CRT, and demands therefor are expanding. A liquid crystal display panel has the advantage that it is thin and has low power consumption. On the other hand, it has the defect that it is unsatisfactory in terms of a luminance and a viewing angle as compared with CRT. Accordingly, it has been tried to solve the above defect by using a backlight and scattering light transmitting a panel.

A method in which a light-diffusing pressure-sensitive adhesive layer comprising inorganic fine particles dispersed in a transparent resin is provided in a liquid crystal cell to thereby enhance expansion of a viewing angle and a displayed quality is proposed as one of the above trials (refer to a patent document 1 and claims thereof). Further, in a reflection type liquid crystal display, proposed is a liquid crystal display in which a diffusing pressure-sensitive adhesive layer comprising a pressure-sensitive adhesive blended with a filler for diffusing light is applied on a liquid crystal panel in order to diffuse light transmitted, and it is disclosed to provide a release sheet on both sides of the diffusing pressure-sensitive adhesive layer (refer to a patent document 2 and claims thereof).

However, though the above liquid crystal display panels are inhibited from causing an uneven luminance by diffusion of light and have even brightness, they used to have the problem that they are inferior in durability. To be specific, bubbles are produced in a light-diffusing pressure-sensitive adhesive layer with the passage of time in using a liquid crystal display panel to cause an uneven luminance. Further, lifting and peeling brought about with the passage of time in a polarizing plate disposed on a liquid crystal cell via a pressure-sensitive adhesive or a retardation film disposed between a polarizing plate and a liquid crystal cell via a pressure-sensitive adhesive in order to improve the viewing angle characteristics are caused in a certain case. Also, in the case of providing release sheets on both sides of a diffusing pressure-sensitive adhesive layer, the diffusing pressure-sensitive adhesive layer is peeled off (hereinafter "parting") as well from the other release sheet when peeling one release sheet from the diffusing pressure-sensitive adhesive layer.

Patent document 1: Japanese Patent Application Laid-Open No. 133606/2001

Patent document 2: Japanese Patent Application Laid-Open No. 223712/1999

SUMMARY OF THE INVENTION

In light of the situation described above, an object of the present invention is to provide a pressure-sensitive adhesive for applying an optically functional film by which adhesion can be carried out with good durability in adhesion of an optically functional film, to be more specific, adhesion of a polarizing plate, particularly a polarizing plate integrated with a viewing angle expanding film and the like with a liquid crystal cell, adhesion of a polarizing plate with a retardation film, adhesion between retardation films and adhesion of a retardation film with a liquid crystal cell and which endows a liquid crystal display with even brightness without bringing about bubbles in a pressure-sensitive adhesive layer and an uneven luminance even after the passage of time, an optically functional film and a production process for the same and a pressure-sensitive adhesive sheet which does not bring about "parting" and is excellent in an optical functionality and an applying workability of the film.

Intensive researches repeated by the present inventors in order to solve the problems described above have resulted in finding that the above object can be achieved by a pressure-sensitive adhesive comprising a pressure-sensitive adhesive resin and fine particles and having a specific storage elastic modulus (G') and a specific haze value. The present invention has been completed based on the above knowledge.

That is, the present invention provides:

(1) a pressure-sensitive adhesive for applying an optically functional film comprising a pressure-sensitive adhesive resin and fine particles having an average particle diameter of 0.1 to 20 μm, wherein a storage elastic modulus (G') at 23° C. is 0.3 to 15 MPa, and a haze value is 5% or more, (2) the pressure-sensitive adhesive for applying an optically functional film as described in the above item (1), wherein a storage elastic modulus (G') at 80° C. is 0.3 MPa or more, (3) the pressure-sensitive adhesive for applying an optically functional film as described in the above item (2), wherein a storage elastic modulus (G') at 80° C. is 0.3 to 10 MPa, (4) the pressure-sensitive adhesive for applying an optically functional film as described in any of the above items (1) to (3), wherein a gel ratio is 60% or more, (5) the pressure-sensitive adhesive for applying an optically functional film as described in any of the above items (1) to (4), wherein the optically functional film described above is a polarizing plate and/or a retardation film, and it is used for applying of a polarizing plate with a liquid crystal glass cell, applying of a polarizing plate with a retardation film, applying of a retardation film with a retardation film or applying of a retardation film with a liquid crystal glass cell, (6) the pressure-sensitive adhesive for applying an optically functional film as described in any of the above items (1) to (5), wherein the pressure-sensitive adhesive resin described above comprises (A) an acrylic copolymer and (B) an active energy beam-curable compound, and a pressure-sensitive adhesive material obtained by dispersing the fine particles described above in the above pressure-sensitive adhesive resin is irradiated with an active energy beam, (7) the pressure-sensitive adhesive for applying an optically functional film as described in the above item (6), wherein the active energy beam-curable compound of the component (B) is a multifunctional (meth)acrylate base monomer having a molecular weight of less than 1000, (8) the pressure-sensitive adhesive for applying an optically functional film as described in the above item (7), wherein the multifunctional (meth)acrylate base monomer has a cyclic structure, (9) the pressure-sensitive adhesive for applying an optically functional film as described in the above item (8), wherein the multifunctional (meth)acrylate base monomer has an isocyanurate structure, (10) the pressure-sensitive adhesive for applying an optically functional film as described in any of the above items (6) to (9), wherein a content ratio of the component (A) to the component (B) is 100:1 to 100:100 in terms of a mass ratio, (11) the pressure-sensitive adhesive for applying an optically functional film as described in any of the above items (6) to (10), wherein the pressure-sensitive adhesive material further comprises a cross-linking agent as a component (C),
(12) the pressure-sensitive adhesive for applying an optically functional film as described in any of the above items (6) to (11), wherein the pressure-sensitive adhesive material further comprises a silane coupling agent as a component (D),
(13) the pressure-sensitive adhesive for applying an optically functional film as described in any of the above items (5) to (12), wherein the polarizing plate comprises a polarizing film integrated with a viewing angle expanding film,
(14) the pressure-sensitive adhesive for applying an optically functional film as described in any of the above items (1) to (13), wherein an adhesive strength to non-alkali glass is 0.2 N/25 mm or more,
(15) the pressure-sensitive adhesive for applying an optically functional film as described in any of the above items (1) to (14), wherein a holding power at 80° C. is 200 μm or less in terms of a displacement amount after 70000 seconds,
(16) an optically functional film with the pressure-sensitive adhesive, characterized by having a layer comprising the pressure-sensitive adhesive as described in any of the above items (1) to (15) on an optically functional film,
(17) a production process for the optically functional film with the pressure-sensitive adhesive as described in the above item (16), characterized by applying the optically functional film on a pressure-sensitive adhesive material layer provided on a release layer of a release sheet and then irradiating a release sheet side with an active energy beam,
(18) a pressure-sensitive adhesive sheet prepared by interposing the pressure-sensitive adhesive as described in any of the above items (1) to (15) between two release sheets so that the pressure-sensitive adhesive is brought into contact with release layer sides of the release sheets and
(19) a production process for an optically functional film, comprising applying a polarizing plate on a retardation film with the pressure-sensitive adhesive sheet as described in the above item (18).

According to the pressure-sensitive adhesive of the present invention, adhesion can be carried out with a good durability in adhesion of an optically functional film, to be more specific, adhesion of a polarizing plate, particularly a polarizing plate integrated with a viewing angle expanding film with a liquid crystal cell, adhesion of a polarizing plate with a retardation film, adhesion of a retardation film with a retardation film and adhesion of a retardation film with a liquid crystal cell, and even brightness can be obtained without causing an uneven luminance in a liquid crystal display. Further, bubbles are not produced in a pressure-sensitive adhesive layer even after time passes, and an uneven luminance is not brought about. Accordingly, use of the pressure-sensitive adhesive of the present invention makes it possible to maintain even brightness over a long period of time without causing an uneven luminance in a liquid crystal display.

EXPLANATIONS OF THE CODES 1, 2: Liquid crystal displays
11, 21: Polarizing plates
12, 22, 25: Pressure-sensitive adhesives
13, 23: Glass (liquid crystal cells)
24: Retardation film

DETAILED DESCRIPTION OF THE INVENTION

The present invention relates to a pressure-sensitive adhesive for applying an optically functional film, particularly to a pressure-sensitive adhesive used for adhesion of a polarizing plate which is a kind of an optically functional film with a liquid crystal cell, adhesion between optically functional films such as a polarizing plate with a retardation film or a retardation film with a retardation film, adhesion of a retardation film with a retardation film and adhesion of a retardation film which is a kind of an optically functional film with a liquid crystal cell.

Figure 1:
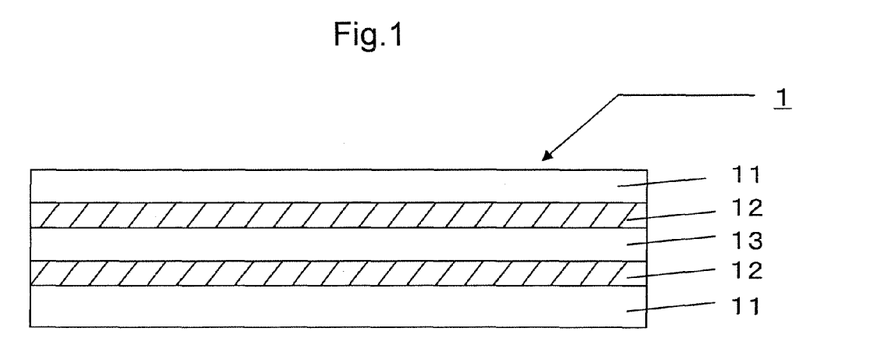
FIG. 1 is an outline drawing showing a constitution example of LCD of the present invention.

First, a case in which a polarizing plate is applied on a liquid crystal cell of a liquid crystal display (LCD) shall be explained with reference to FIG. 1.

A liquid crystal cell 13 has usually a structure in which two transparent electrode substrates having orientation layers formed thereon are disposed with the orientation layers turned to an inside so that a prescribed interval is formed by spacers, in which the periphery thereof is sealed to interpose a liquid crystal material in the above interval and in which polarizing plates 11 are disposed respectively on the two transparent electrode substrates described above via pressure-sensitive adhesives 12. In general, the polarizing plate described above comprises a polarizing film having a three layer structure in which optically isotropic films, for example, a triacetyl cellulose (TAC) films are applied on both surfaces of a polyvinyl alcohol base polarizer, and a pressure-sensitive adhesive layer is further provided on the other surface thereof for the purpose of applying on an optical part such as a liquid crystal cell. The pressure-sensitive adhesive of the present invention is suitably used as a material for the above pressure-sensitive adhesive layer.

Figure 2:
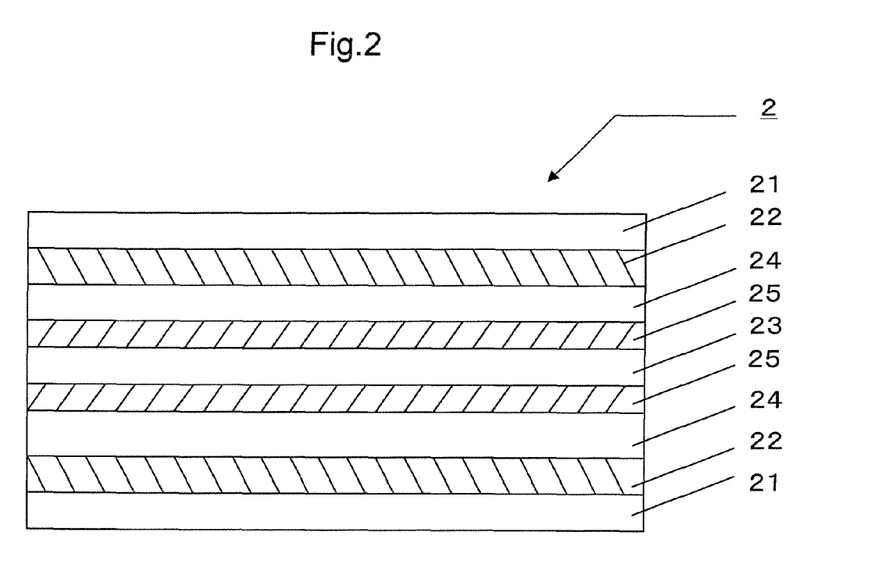
FIG. 2 is an outline drawing showing a constitution example of LCD of the present invention.

Further, as shown in a schematic drawing of FIG. 2, a retardation film 24 is disposed in a certain case between a polarizing plate 21 and a liquid crystal cell 23 via pressure-sensitive adhesives 22 and 25 in order to improve the viewing angle characteristics. The pressure-sensitive adhesive of the present invention is suitably used as the pressure-sensitive adhesives 22 and 25 used in the above case.

The pressure-sensitive adhesive of the present invention for applying an optically functional film is provided by a pressure-sensitive adhesive comprising a pressure-sensitive adhesive resin and fine particles having an average particle diameter of 0.1 to 20 μm as principal components.

The pressure-sensitive adhesive resin comprises preferably (A) an acrylic copolymer and (B) an active energy beam-curable compound, and preferred is a pressure-sensitive adhesive obtained by irradiating a pressure-sensitive adhesive material prepared by dispersing the fine particles described above in the above pressure-sensitive adhesive resin with an active energy beam.

(Meth)acrylic ester base copolymers can be given as the acrylic copolymer which is the component (A). In the present invention, (meth)acrylic ester means both of acrylic ester and methacrylic ester. The same shall apply to other similar terms.

Copolymers having cross-linking points which can be cross-linked by various cross-linking methods are preferably used as the (meth)acrylic ester base copolymers described above. The above (meth)acrylic ester base copolymers having cross-linking points shall not specifically be restricted, and optional copolymers suitably selected from (meth)acrylic ester base copolymers which have so far been conventionally used as resin components for pressure-sensitive adhesives can be used.

Copolymers of (meth)acrylic esters in which an alkyl group in an ester part has 1 to 20 carbon atoms, monomers having a cross-linkable functional group in a molecule and other monomers which are used if necessary can be given as the above (meth)acrylic ester base copolymers having cross-linking points. In this regard, the examples of the (meth) acrylic ester in which an alkyl group in an ester part has 1 to 20 carbon atoms include methyl(meth)acrylate, ethyl(meth) acrylate, propyl(meth)acrylate, butyl (meth)acrylate, pentyl (meth)acrylate, hexyl (meth)acrylate, cyclohexyl(meth)acrylate, 2-ethylhexyl(meth)acrylate, isooctyl(meth)acrylate, decyl(meth)acrylate, dodecyl(meth)acrylate, myristyl(meth) acrylate, palmityl(meth)acrylate and stearyl(meth)acrylate. They may be used alone or in combination of two or more kinds thereof.

On the other hand, the monomers having a cross-linkable functional group in a molecule contain preferably at least one of a hydroxyl group, a carboxyl group, an amino group and an amide group as a functional group, and the specific examples thereof include hydroxyalkyl(meth)acrylates such as 2-hydroxyethyl(meth)acrylate, 2-hydroxypropyl (meth)acrylate, 3-hydroxypropyl(meth)acrylate, 2-hydroxybutyl(meth)acrylate, 3-hydroxybutyl (meth)acrylate and 4-hydroxybutyl (meth)acrylate; acrylamides such as (meth)acrylamide, N-methyl(meth)acrylamide and N-methylol(meth)acrylamide; (meth)acrylic monoalkylamino esters such as monomethylaminoethyl (meth)acrylate, monoethylaminoethyl (meth)acrylate, monomethylaminopropyl(meth)acrylate and monoethylaminopropyl(meth)acrylate; and ethylenically unsaturated carboxylic acids such as acrylic acid, methacrylic acid, crotonic acid, maleic acid, itaconic acid and citraconic acid. The above monomers may be used alone or in combination of two or more kinds thereof.

In the above pressure-sensitive adhesive material, the (meth)acrylic ester base copolymer used as the component (A) shall not specifically be restricted in a copolymerization form, and they may be any of random, block and graft copolymers. The copolymers having a molecular weight of 500,000 or more in terms of a weight-average molecular weight are usually used. If this weight-average molecular weight is 500,000 or more, the adhesion with an adherend and the adhesive durability are satisfactory, and lifting and peeling are not brought about. Considering the adhesion and the adhesive durability, the above weight-average molecular weight is preferably 600,000 to 2,200,000, particularly preferably 700,000 to 2,000,000.

The weight-average molecular weight described above is a value reduced to polystyrene which is measured by gel permeation chromatography (GPC).

Further, in the above (meth)acrylic ester base copolymer, a content of a monomer unit having a cross-linkable functional group in a molecule falls preferably in a range of 0.01 to 10 mass %. If the above content is 0.01 mass % or more, cross-linking becomes satisfactory by reaction with a cross-linking agent described later, and the durability is improved. On the other hand, if the content is 10 mass % or less, an aptitude of applying onto a liquid crystal glass cell or a retardation film is prevented from being reduced due to the too high cross-linking degree, and therefore it is preferred. Considering the durability and the aptitude of applying onto a liquid crystal glass cell or a retardation film, a content of the above monomer unit having a cross-linkable functional group falls more preferably in a range of 0.05 to 7.0 mass %, particularly preferably 0.2 to 6.0 mass %.

In the present invention, the (meth)acrylic ester base copolymer of the component (A) may be used alone or in combination of two or more kinds thereof.

In the above pressure-sensitive adhesive material, multifunctional (meth)acrylate base monomers having a molecular weight of less than 1000 can preferably be given as the active energy beam-curable compound used as the component (B).

The above multifunctional (meth)acrylate base monomers having a molecular weight of less than 1000 include, for example, a difunctional type such as 1,4-butanediol di(meth) acrylate, 1,6-hexanediol di(meth)acrylate, neopentyl glycol di(meth)acrylate, polyethylene glycol di(meth)acrylate, neopentyl glycol adipate di(meth)acrylate, hydroxypivalic acid neopentyl glycol di(meth)acrylate, dicyclopentanyl di(meth) acrylate, caprolactone-modified dicyclopentenyl di(meth) acrylate, ethylene oxide-modified phosphoric acid di(meth) acrylate, di(acryloxyethyl) isocyanurate, allylated cyclohexyl di(meth)acrylate, dimethyloldicyclopentane di(meth)acrylate, ethylene oxide-modified hexahydrophthalic acid di(meth)acrylate, tricyclodecanedimethanol (meth)acrylate, neopentyl glycol-modified trimethylolpropane di(meth)acrylate, adamantane di(meth)acrylate and 9,9-bis[4-(2-acryloyloxyethoxy)phenyl]fluorene; a trifunctional type such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth) acrylate and tris(acryloxyethyl) isocyanurate; a tetrafunctional type such as diglycerin tetra(meth)acrylate and pentaerythritol tetra(meth)acrylate; a pentafunctional type such as propionic acid-modified dipentaerythritol penta (meth)acrylate; and a hexafunctional type such as dipentaerythritol hexa(meth)acrylate and caprolactone-modified dipentaerythritol hexa(meth)acrylate.

In the present invention, only one kind of the above multifunctional (meth)acrylate base monomers may be used alone or they may be used in combination of two or more kinds thereof. Among them, those having a cyclic structure in a skeleton structure are preferably contained therein. The cyclic structure may be a carbocyclic structure or a heterocyclic structure and may be a monocyclic structure or a polycyclic structure. Suited as the above multifunctional (meth) acrylate base monomer are, for example, those having an isocyanurate structure such as di(acryloxyethyl)isocyanurate and tris(acryloxyethyl)isocyanurate, dimethyloldicyclopentane diacrylate, ethylene oxide-modified hexahydrophthalic acid diacrylate, tricyclodecanedimethanol acrylate, neopentyl glycol-modified trimethylolpropane diacrylate and adamantane diacrylate.

An acrylate base oligomer of an active energy beam-curable type can be used as the component (B). The examples of the above acrylate base oligomer include polyester acrylates, epoxy acrylates, urethane acrylates, polyether acrylates, polybutadiene acrylates and silicone acrylates.

In this respect, the polyester acrylate base oligomers are obtained, for example, by esterifying the hydroxyl groups of a polyester oligomer having hydroxyl groups at both ends which is obtained by condensation of polyvalent carboxylic acid and polyhydric alcohol with (meth)acrylic acid or by esterifying a hydroxyl group at an end of an oligomer obtained by adding alkylene oxide to polyvalent carboxylic acid with (meth)acrylic acid. The epoxy acrylate base oligomers are obtained, for example, by reacting an oxirane ring of a bisphenol type epoxy resin or a novolak type epoxy resin having a relatively low molecular weight with (meth)acrylic acid and esterifying it. Further, capable of being used as well are epoxy acrylate oligomers of a carboxyl-modified type obtained by modifying partially the above epoxy acrylate base oligomers with dibasic carboxylic anhydride. The urethane acrylate base oligomers are obtained, for example, by esterifying a polyurethane oligomer obtained by reacting polyetherpolyol or polyesterpolyol with polyisocyanate with (meth)acrylic acid, and the polyol acrylate base oligomers are obtained by esterifying a hydroxyl group of polyetherpolyol with (meth)acrylic acid.

A weight-average molecular weight of the acrylate base oligomers described above is selected in a range of preferably 50,000 or less, more preferably 500 to 50,000 and further preferably 3,000 to 40,000 in terms of a value reduced to standard polymethyl methacrylate which is measured by GPC method.

The above acrylate base oligomers may be used alone or in combination of two or more kinds thereof.

In the present invention, an adduct acrylate base polymer in which a group having a (meth)acryloyl group is introduced into a side chain can also be used as the component (B). The above adduct acrylate base polymer can be obtained, for example, by using a copolymer of (meth)acrylic ester and a monomer having a cross-linkable functional group in a molecule, which is explained in the (meth)acrylic ester polymer of the component (A) described above, to react a part of the cross-linkable functional group of the above copolymer with a compound having a (meth)acryloyl group and a group which is reactable with the above cross-linkable functional group. A weight-average molecular weight of the above adduct acrylate base polymer is usually 500,000 to 2,000,000 in terms of a value reduced to polystyrene.

In the present invention, one suitably selected from the multifunctional acrylate base monomer, the acrylate base oligomer and the adduct acrylate base polymer each described above may be used as the component (B) or two or more kinds selected from them may be used in combination.

In the present invention, a content ratio of the acrylic polymer of the component (A) to the active energy beam-curable compound of the component (B) falls in a range of preferably 100:1 to 100:100, more preferably 100:5 to 100:50 and further preferably 100:10 to 100:40 in terms of a mass ratio from the viewpoint of the performances of the pressure-sensitive adhesive obtained.

Next, the fine particles used for the pressure-sensitive adhesive of the present invention are used in order to diffuse light, and capable of being given are, to be specific, inorganic white pigments such as silica, calcium carbonate, aluminum hydroxide, magnesium hydroxide, clay, talc and titanium dioxide; and organic transparent or white pigments such as acrylic resins, polystyrene resins, polyethylene resins, epoxy resins and silicone resins. When an acrylic copolymer is selected as the pressure-sensitive adhesive resin, silicone beads, epoxy resin beads and polymethyl methacrylate beads are preferred since they are excellent in dispersibility to the acrylic copolymer and provide an even and good light diffusivity. Further, the fine particles are preferably spherical fine particles having even light diffusion.

The above fine particles have an average particle diameter falling in a range of 0.1 to 20 μm. If the average particle diameter is less than 0.1 μm, the light diffusivity is reduced, and the effect of the present invention that even brightness having no uneven illuminance is obtained in a liquid crystal display can not be achieved. On the other hand, if the average particle diameter exceeds 20 μm, an adverse effect is exerted on a contrast of the images, and when the particles are larger than an image pitch of the display, glaring is caused. From the viewpoints described above, the above fine particles have an average particle diameter falling in a range of preferably 1 to 10 μm, particularly preferably 0.5 to 10 μm.

In this regard, an average particle diameter of the fine particles is a value measured by a centrifugal settling light transmission method. A centrifugal automatic particle size distribution measuring device ("CAPA-700", manufactured by HORIBA, Ltd.) was used for the measurement, and a liquid comprising 1.2 g of the fine particles and 98.8 g of isopropyl alcohol which was sufficiently stirred was used as a sample for the measurement.

The fine particles in the pressure-sensitive adhesive of the present invention have a content falling preferably in a range of 1 to 40 mass %. If the above content is 1 mass % or more, the effect of the present invention that even brightness having no uneven illuminance is obtained can be achieved. On the other hand, if the fine particles have a content of 40 mass % or less, an adhesive strength of the pressure-sensitive adhesive is secured.

A photopolymerization initiator can be added, if necessary, to the pressure-sensitive adhesive material in the present invention. The above photopolymerization initiator includes, for example, benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminobenzoic ester, oligo[2-hydroxy-2-methyl-1-[4-(1-methylvinyl)phenyl]propanone] and 2,4,6-trimethylbenzoyl-diphenyl-phosphine oxide. They may be used alone or in combination of two or more kinds thereof. A blending amount thereof is selected usually in a range of 0.2 to 20 mass parts per 100 parts of the component (B) described above.

A cross-linking agent can be added, if necessary, as a component (C) to the pressure-sensitive adhesive material in the present invention. The above cross-linking agent shall not specifically be restricted, and optional ones suitably selected from those which have so far conventionally been used as a cross-linking agent in acrylic base pressure-sensitive adhesives can be used. The above cross-linking agent includes, for example, polyisocyanate compounds, epoxy resins, melamine resins, urea resins, dialdehydes, methylol polymers, aziridine base compounds, metal chelate compounds, metal alkoxides and metal salts, and the polyisocyanate compounds are preferably used.

In this respect, capable of being given as the polyisocyanate compounds are aromatic polyisocyanates such as tolylenediisocyanate, diphenylmethanediisocyanate and xylylenediisocyanate, aliphatic polyisocyanates such as hexamethylenediisocyanate, alicyclic polyisocyanates such as isophoronediisocyanate and hydrogenated diphenylmethanediisocyanate, buret bodies and isocyanurate bodies thereof and adduct bodies which are reaction products thereof with low molecular active hydrogen-containing compounds such as ethylene glycol, propylene glycol, neopentyl glycol, trimethylolpropane and castor oil.

In the present invention, the cross-linking described above agents may be used alone or in combination of two or more kinds thereof. A use amount thereof is, though depending on the kind of the cross-linking agent, usually 0.01 to 20 mass parts, preferably 0.1 to 10 mass parts per 100 mass parts of the acrylic base polymer of the component (A) described above.

Further, a silane coupling agent can be added, if necessary, as a component (D) to the pressure-sensitive adhesive material in the present invention. Addition of the above silane coupling agent improves more an adhesion between the pressure-sensitive adhesive and the liquid crystal cell when applying an optically functional film such as a polarizing plate, for example, on a liquid crystal cell. The above silane coupling agent is suitably an organosilicon compound which has at least one alkoxysilyl group in a molecule and which is well compatible with a pressure-sensitive adhesive component and has a light transmittance, for example, a substantially transparent compound. An addition amount of the above silane coupling agent falls in a range of preferably 0.001 to 10 mass parts, particularly preferably 0.005 to 5 mass parts per 100 mass parts of the acrylic base copolymer of the component (A) described above.

The specific examples of the silane coupling agent described above include polymerizable unsaturated group-containing silicon compounds such as vinyltrimethoxysilane, vinyltriethoxysilane and 3-methacryloxypropyltrimethoxysilane, silicon compounds having an epoxy structure such as 3-glycidoxypropyltrimethoxysilane and 2-(3,4-epoxycyclohexyl)ethyltrimethoxysilane, amino group-containing silicon compounds such as 3-aminopropyltrimethoxysilane, N-(2-aminoethyl)-3-aminopropyltrimethoxysilane and N-(2-aminoethyl)-3-aminopropylmethyldimethoxysilane and 3-chloropropyltrimethoxysilane. They may be used alone or in combination of two or more kinds thereof.

Various additives usually used for acrylic base pressure-sensitive adhesives, for example, tackifiers, antioxidants, ultraviolet absorbers (UV absorbers), light stabilizers, softening agents and the like can be added, if necessary, to the pressure-sensitive adhesive material in the present invention as long as the object of the present invention is not damaged.

The pressure-sensitive adhesive of the present invention for applying an optically functional film is prepared by irradiating the foregoing pressure-sensitive adhesive material thus obtained with an active energy beam.

The active energy beam includes, for example, a ultraviolet ray (UV ray) and an electron beam. The UV ray described above is obtained by means of a high pressure mercury lamp, an electrodeless lamp and a xenon lamp. On the other hand, the electron beam is obtained by means of an electron beam accelerator. Among the above active energy beams, a UV ray is particularly suited. When using an electron beam, the pressure-sensitive adhesive can be formed without adding a photopolymerization initiator.

A dose of the active energy beam irradiated onto the above pressure-sensitive adhesive material is suitably selected so that the pressure-sensitive adhesive having a storage elastic modulus described later in details and an adhesive strength to non-alkali glass can be obtained. In the case of a UV ray, a light intensity falls preferably in a range of 50 to 1000 mW/cm$^2$, and a light quantity falls preferably in a range of 50 to 1000 mJ/cm$^2$. In the case of an electron beam, it falls preferably in a range of 10 to 1000 krad.

It is necessary that the pressure-sensitive adhesive of the present invention has a storage elastic modulus (G') of 0.3 to 15 MPa at 23° C. If this storage elastic modulus (G') is less than 0.3 MPa, bubbles are produced in the pressure-sensitive adhesive layer in a certain case to bring about an uneven luminance, and lifting and peeling of an optically functional film such as a polarizing plate and a retardation film are brought about in a certain case with the passage of time. On the other hand, if the storage elastic modulus (G') exceeds 15 MPa, the satisfactory adhesion durability is not obtained.

From the viewpoint described above, the storage elastic modulus (G') is particularly preferably 0.35 to 12 MPa, most preferably 0.5 to 5 MPa.

Usually, the storage elastic modulus (G') at 80° C. is preferably 0.3 MPa or more, more preferably 0.3 to 10 MPa and particularly preferably 0.4 to 3 MPa from the viewpoint of the durability.

The storage elastic modulus (G') described above is a value measured by the following method.

<Measuring Method of Storage Elastic Modulus (G')>

The pressure-sensitive adhesive having a thickness of 30 μm is laminated to prepare a cylindrical test piece of 8 mmφ (diameter)×3 mm thickness, and a storage elastic modulus (G') thereof is measured by a torsional shear method on the following conditions.

Measuring apparatus: dynamic viscoelasticity measuring apparatus "DYNAMIC ANALYZER RDAII" manufactured by Rheometric Corporation
Frequency: 1 Hz
Temperature: 23° C. and 80° C.

Next, the pressure-sensitive adhesive of the present invention has a haze value of 5% or more. If the haze value is 5% or more, the image contrast and the visibility are improved. An upper limit of the haze value shall not specifically be restricted as long as it falls in a range in which the effects of the present invention are exerted, and it is preferably 90% or less from the viewpoints of the durability and the physical property of pressure-sensitive adhesive property. From the viewpoints described above, the haze value falls in a range of preferably 20 to 90%, more preferably 30 to 75%. In this connection, the haze value is measured according to JIS K7105, and a diffusion transmission (Hd %) and a whole light transmission (Ht %) are measured by means of an integration spherical light transmission measuring device to calculate the haze value according to the following equation.

$$\text{Haze value} = Hd/Ht \times 100$$

Also, the pressure-sensitive adhesive of the present invention has preferably a gel ratio of 60% or more. That is, when an extent of a low molecular component which is extracted with an organic solvent is small, lifting, peeling and stain to the adherend are small in the environment of heating or high temperature and high humidity, and the pressure-sensitive adhesive having a gel ratio of 60% or more has a high durability and a high stability. The gel ratio is more preferably 85% or more, particularly preferably 90 to 99.9%.

A liquid crystal display prepared by using the pressure-sensitive adhesive of the present invention for applying an optically functional film to adhere a polarizing plate on a liquid crystal glass cell or a retardation film in the manner described above is less liable to cause light leakage even under the environment of high temperature and high humidity, and in addition thereto, it is excellent in an adhesion durability with the polarizing plate with the liquid crystal glass cell.

In the pressure-sensitive adhesive of the present invention for applying an optically functional film, an adhesive strength to non-alkali glass is preferably 0.2 N/25 mm or more. If this adhesive strength is 0.2 N/25 mm or more, the optically functional film such as the polarizing plate can be applied on, for example, the liquid crystal glass cell at a satisfactory adhesive strength. More preferred adhesive strength is 1.0 to 50 N/25 mm.

Further, the adhesive strength to polycarbonate is preferably 5 N/25 mm or more. If this adhesive strength is 5 N/25 mm or more, the polarizing plate can be applied on, for example, the retardation film at a satisfactory adhesive strength.

A measuring method of the adhesive strength described above shall be described later in details.

The pressure-sensitive adhesive of the present invention for applying an optically functional film has preferably a holding power of 200 μm or less at 80° C. in terms of a displacement amount after 70000 seconds. If this displacement amount is 200 μm or less, the satisfactory applying state can be maintained over a long period of time when the optically functional film such as the polarizing plate is applied on, for example, the liquid crystal glass cell. The above displacement amount is more preferably 100 μm or less.

A measuring (measurement of the holding power) method of the displacement amount described above shall be described later in details.

The pressure-sensitive adhesive of the present invention is used for applying an optically functional film, and it is suitably used particularly for applying a polarizing plate with a liquid crystal glass cell, a polarizing plate with a retardation film, a retardation film with a retardation film or a retardation film with a liquid crystal glass cell.

To be more specific, the pressure-sensitive adhesive is applied to a polarizing plate comprising a polarizing film alone and can be used for applying the above polarizing plate to, for example, a liquid crystal glass cell. In particular, the pressure-sensitive adhesive is applied to a polarizing plate comprising a polarizing film integrated with a viewing angle expanding film and can preferably be used for applying the above polarizing plate to, for example, a liquid crystal glass cell.

The foregoing polarizing plate comprising a polarizing film integrated with a viewing angle expanding film includes, for example, a polarizing plate in which a viewing angle expanding function layer comprising a discotic liquid crystal is provided by coating on one face of a polarizing film prepared by sticking a triacetyl cellulose (TAC) film respectively on both faces of a polyvinyl alcohol base polarizer and a polarizing plate on which a viewing angle expanding film is stuck with an adhesive. In this case, the pressure-sensitive adhesive is provided on the side of the viewing angle expanding function layer or the viewing angle expanding film described above.

Also when a retardation film is present, as shown in FIG. 2, between a polarizing plate and a liquid crystal glass cell, the pressure-sensitive adhesive of the present invention for applying an optically functional film can suitably be used. That is, a polarizing plate comprising a polarizing film alone is applied on the retardation film with the pressure-sensitive adhesive of the present invention to produce an optical film, and the retardation film of the above optical film is applied on the liquid crystal glass cell with the pressure-sensitive adhesive.

In this respect, when the polarizing plate is applied on the retardation film with the pressure-sensitive adhesive of the present invention, pressure-sensitive adhesives other than the pressure-sensitive adhesive of the present invention can also be used as a pressure-sensitive adhesive for applying the retardation film on the liquid crystal glass cell and shall not specifically be restricted, but the pressure-sensitive adhesive of the present invention is more preferably used. The pressure-sensitive adhesives other than the pressure-sensitive adhesive of the present invention include, for example, a pressure-sensitive adhesive composition comprising an acrylic base polymer, a cross-linking agent and a silane compound, which is disclosed in Japanese Patent Application Laid-Open No. 131033/1999.

The present invention provides as well an optically functional film with a pressure-sensitive adhesive having a layer comprising the pressure-sensitive adhesive of the present invention described above on an optically functional film such as a polarizing plate. To be more specific, the optically functional film includes a polarizing plate with a pressure-sensitive adhesive, and this polarizing plate may be, as described above, a polarizing plate comprising a polarizing film alone. In the case of a constitution shown in FIG. 1, however, a polarizing plate comprising a polarizing film integrated with a viewing angle expanding film is preferred.

A layer comprising the above pressure-sensitive adhesive has a thickness of usually 5 to 100 μm, preferably 10 to 50 μm and more preferably 10 to 30 μm.

A production process for the above optically functional film with the pressure-sensitive adhesive may be any process as long as it is a process in which an optically functional film provided with a layer comprising the pressure-sensitive adhesive of the present invention on an optically functional film such as a polarizing plate is obtained, and it shall not specifically be restricted. According to the process of the present invention shown below, the desired optically functional film with the pressure-sensitive adhesive can efficiently be produced.

In the process of the present invention, the optically functional film such as the polarizing plate is applied on the pressure-sensitive adhesive material layer provided on a release layer of a release sheet, and then the side of the above release sheet is irradiated with an active energy beam so that the pressure-sensitive adhesive material layer described above is turned into a layer having the prescribed characteristic described above which is constituted from the pressure-sensitive adhesive of the present invention, whereby the optically functional film with the pressure-sensitive adhesive of the present invention is obtained.

The release sheet described above includes a sheet prepared by coating a releasing agent such as a silicone resin on a plastic film such as a polyester film of polyethylene terephthalate, polybutylene terephthalate, polyethylene naphthalate or the like and a polyolefin film of polypropylene, polyethylene or the like to provide a release layer. A thickness of the above release sheet shall not specifically be restricted and is usually 20 to 150 μm.

The pressure-sensitive adhesive material and the irradiating conditions of the active energy beam have already been explained in the pressure-sensitive adhesive of the present invention for applying an optically functional film described above.

Capable of being used as a method for providing the pressure-sensitive adhesive material layer on the release sheet is, for example, a method in which a pressure-sensitive adhesive material containing a solvent is coated by means of a bar coating method, a knife coating method, a roll coating method, a blade coating method, a die coating method and a gravure coating method to form a coating film and in which the coating film is dried. The drying conditions shall not specifically be restricted, and it is dried usually at 50 to 150° C. for 10 seconds to 10 minutes. The solvent includes, for example, toluene, ethyl acetate, methyl ethyl ketone and the like.

In the case of a constitution shown in FIG. 2, a polarizing plate comprises a polarizing film alone in many cases, and a layer comprising a pressure-sensitive adhesive for a polarizing plate has the same thickness as described above. A production process for the polarizing plate with the pressure-sensitive adhesive in the constitution shown in FIG. 2 may be any process as long as it is a process in which a polarizing plate provided thereon with a layer comprising the pressure-sensitive adhesive of the present invention is obtained as is the case with the polarizing plate described above, and it shall not specifically be restricted. The polarizing plate can efficiently be produced by the production process of the present invention described above.

Further, in the case of the constitution shown in FIG. 2, prepared in advance is a pressure-sensitive adhesive sheet in which the pressure-sensitive adhesive (pressure-sensitive adhesive for applying an optically functional film) for polarizing plates described above is interposed so that it is brought into contact with the release layer sides of two release sheets, and the above pressure-sensitive adhesive sheet can be used to apply the polarizing plate on the retardation film. In this case, when the component (B) described above is used as the pressure-sensitive adhesive, an active energy beam may be irradiated after the pressure-sensitive adhesive material is interposed between two release sheets, or the pressure-sensitive adhesive material layer may be provided on one release sheet and irradiated with the active energy beam, and then it may be interposed with the other release sheet. The irradiation conditions of the active energy beam are selected so that obtained is a layer having the prescribed characteristics described above which is constituted from the pressure-sensitive adhesive of the present invention.

When the above pressure-sensitive adhesive interposed between two release sheets is used to produce the optical film of the present invention, one release sheet is peeled off, and the pressure-sensitive adhesive sheet is applied on the polarizing plate or the retardation film by an ordinary method.

EXAMPLES

Next, the present invention shall be explained below in further details with reference to examples, but the present invention shall by no means be restricted by these examples.

The performances of the pressure-sensitive adhesives, the polarizing plates with the pressure-sensitive adhesive and the pressure-sensitive adhesive sheets which were obtained in Examples 1 to 8 and Comparative Examples 1 to 3 were determined by methods shown below.

(1) Storage Elastic Modulus of Pressure-Sensitive Adhesive

The storage elastic moduli at 23° C. and 80° C. were measured according to the method described in the present specification.

(2) Adhesive Strength (Adhesive Strength to Non-Alkali Glass)

Two samples having a width of 25 mm and a length of 100 mm were cut out from the polarizing plate with the pressure-sensitive adhesive, and after the release sheets were peeled off therefrom (thickness of the pressure-sensitive adhesive: 25 µm), the samples were applied on non-alkali glass ("1737" manufactured by Corning Incorporated) and then pressurized in an autoclave manufactured by Kurihara Manufactory Inc. on the conditions of 0.5 MPa, 50° C. and 20 minutes. Thereafter, they were left standing for 24 hours under the environment of 23° C. and a relative humidity of 50%, and then the adhesive strength was measured under the above environment by means of a tensile tester (Tensilon manufactured by Orientech Co., Ltd.) on the conditions of a peeling rate of 300 mm/minute and a peeling angle of 180'.

(3) Haze Value

The release sheet of the film with the pressure-sensitive adhesive was peeled off and removed to measure a diffusion transmittance (Hd %) and a total light transmittance (Ht %) according to JIS K7105 by means of an integration spherical light transmission measuring device ("NDH-2000" manufactured by Nippon Denshoku Industries Co., Ltd.), and the haze value was calculated according to the following equation.

Haze value=$Hd/Ht$×100

(4) Gel Ratio

The pressure-sensitive adhesive having a thickness of 25 µm was sampled in a size of 80 mm×80 mm and wrapped in a polyester-made mesh (mesh size: 200) to weigh precisely only the weight of the pressure-sensitive adhesive by means of a precision balance. The weight thereof is set as M1. A Soxhlet extractor was used to dip the pressure-sensitive adhesive in an ethyl acetate solvent, and the solvent was refluxed to carry out treatment for 16 hours. Then, the pressure-sensitive adhesive was taken out and dried in air for 24 hours under the environment of a temperature of 23° C. and relative humidity of 50%, and it was further dried in an oven of 80° C. for 12 hours. The weight of the pressure-sensitive adhesive alone after dried was weighed by means of a precision balance. The weight thereof is set as M2. The gel ratio (%) is represented by (M2/M1)×100.

(5) Durability of Polarizing Plate with the Pressure-Sensitive Adhesive

The polarizing plate with the pressure-sensitive adhesive was controlled to a size of 233 mm×309 mm by means of a cutting device (Super Cutter "PN1-600" manufactured by OGINO SEIKI CO., LTD.) and applied on non-alkali glass ("1737" manufactured by Corning Incorporated), and then it was pressurized in an autoclave manufactured by Kurihara Manufactory Inc. on the conditions of 0.5 MPa, 50° C. and 20 minutes. Thereafter, it was put under the environment of the respective durability conditions described below and observed after 200 hours by means of a loupe of 10 magnifications to evaluate the durability according to the following judging criteria.

◯: no defects were found in an area of 0.6 mm or more from an outer circumferential end part in four sides X: defects of 0.1 mm or more in abnormality of the appearance of the pressure-sensitive adhesive such as lifting, peeling, bubbles and stripes were found in an area of 0.6 mm or more from an outer circumferential end part in any one side of four sides <Durability Conditions>

Environment of 80° C., 90° C., and 60° C. and a relative humidity of 90%

Heat shock test of −30° C. ⇔ 70° C. for each 30 minutes, 200 cycles (6) Holding Power A sample having a width of 25 mm and a length of 150 mm was cut out from the film with the pressure-sensitive adhesive, and the release sheet was peeled off therefrom (thickness of the pressure-sensitive adhesive: 25 µm) to apply the sample on a test board so that the sample of 25 mm×25 mm (area) was brought into contact with the test board. Then, a roller of 2 kg was reciprocated once on the sample at a speed of 300 mm/minute to press the pressure-sensitive adhesive layer onto the test board. Thereafter, the test board was left standing for 2 hours under the environment of 23° C. and a relative humidity of 50%, and a displacement amount after 70000 seconds was measured at a load of 1000 g under the environment of 80° C. by means of a holding power measuring device described in Japanese Patent Application Laid-Open No. 23449/1999. Used as the test board was a plate obtained by evenly polishing an SUS-304 steel plate having a thickness of 1.5 to 2.0 mm prescribed in JIS-G-4305 in a longitudinal direction with a water-resistant polishing paper of No. 360 prescribed in JIS-R-6253. A digital indicator ("DEGIMATIC INDICATOR" manufactured by Mitsutoyo Corporation) was used as a measuring sensor of the holding power measuring device.

(7) Evaluation of "Parting" in Tears

Twenty pieces of roll-shaped samples having a width of 300 mm and a length of 200 m were prepared from the long pressure-sensitive adhesive sheet, and the number (X) of the rolls in which brought about was the phenomenon ("parting") that peeling was partially caused between the first release sheet and the pressure-sensitive adhesive layer when the second release sheet was peeled off from the pressure-sensitive adhesive layer at a peeling speed of 10 m/minute or 30 m/minute was determined to calculate a "parting" generating rate according to the following equation:

"parting" generating rate=$X/20 \times 100$

Examples 1 to 8 and Comparative Examples 1 to 3

An ethyl acetate solution (solid content: 14 mass %) of a pressure-sensitive adhesive material (a) having a composition (solid content) shown in Table 1 was prepared, and it was coated on a release layer of a polyethylene terephthalate-made release film having a thickness of 38 μm ("SP-PET3811" manufactured by LINTEC Corporation) as a release sheet by means of a knife coater so that the thickness after dried was 25 μm. Then, it was subject to drying treatment at 90° C. for one minute to form a pressure-sensitive adhesive material layer.

Then, a polarizing film with a discotic crystal liquid layer which was a polarizing plate comprising a polarizing film integrated with a viewing angle expanding film was applied on the pressure-sensitive adhesive material layer so that the discotic crystal liquid layer was brought into contact with the pressure-sensitive adhesive material layer. After 30 minutes passed since applied, a release film side was irradiated with a ultraviolet (UV) ray on the following conditions to produce a polarizing plate with the pressure-sensitive adhesive. A numerical value in a parenthesis in a column of silicone beads in Table 1 is a content (mass %) of the silicone beads contained in the pressure-sensitive adhesive.

<UV irradiating Conditions>

Electrodeless lamp using an H valve, manufactured by Fusion Co., Ltd.

Illuminance: 600 mW/cm$^2$, light quantity: 150 mJ/cm$^2$

"UVPF-36" manufactured by EYEGRAPHICS Co., Ltd. was used for a UV illuminance and light quantity meter.

The film with the pressure-sensitive adhesive used for measuring a haze value and a holding power was produced in the following manner. The ethyl acetate solution described above was coated on a polyethylene terephthalate film having a thickness of 100 μm ("COSMOSHINE A-4100" manufactured by TOYOBO CO., LTD.) by means of a knife coater so that the thickness after dried was 25 μm, and then it was subject to drying treatment at 90° C. for one minute to form a pressure-sensitive adhesive material layer. Then, the pressure-sensitive adhesive material layer described above was applied on a release layer of the polyethylene terephthalate-made release film having a thickness of 38 μm ("SP-PET3811" manufactured by LINTEC Corporation) as a release sheet. After 30 minutes passed since applied, a release film side was irradiated with a UV ray on the same conditions as described above to produce a film with the pressure-sensitive adhesive.

Further, a pressure-sensitive adhesive sheet was produced in the following manner. The ethyl acetate solution described above was coated on a release layer of the polyethylene terephthalate-made release film having a thickness of 38 μm ("SP-PET3811" manufactured by LINTEC Corporation) as a first release sheet by means of a knife coater so that the thickness after dried was 25 μm, and then it was subject to drying treatment at 90° C. for one minute to form a pressure-sensitive adhesive material layer.

Then, a polyethylene terephthalate-made release film having a thickness of 38 μm ("SP-PET3801" manufactured by LINTEC Corporation) was used as a second release sheet and applied on the first release sheet so that a release layer of the second release sheet was brought into contact with the pressure-sensitive adhesive material layer described above. After 30 minutes passed since applied, a first release sheet side was irradiated with a UV ray on the same conditions as described above to produce a long pressure-sensitive adhesive sheet in which the pressure-sensitive adhesive was interposed between two release sheets so that it was brought into contact with the release layers.

The evaluation results of the performances of the pressure-sensitive adhesives, the polarizing plates with the pressure-sensitive adhesive and the pressure-sensitive adhesive sheets are shown in Table 2.

TABLE 1

| | Composition (mass part) of pressure-sensitive adhesive material (a) | | | | | |
|---|---|---|---|---|---|---|
| | Acrylic base copolymer[1] (A) | Multi-functional acrylic base monomer[2] (B) | Photo-polymerization initiator[3] | Isocyanate base cross-linking agent[4] (C) | Silane coupling agent[5] (D) | Silicone beads[6] |
| Example 1 | 100 | 15 | 1.5 | 0.3 | 0.2 | 4.7 (3.86) |
| Example 2 | 100 | 15 | 1.5 | 0.3 | 0.2 | 9.3 (7.36) |
| Example 3 | 100 | 15 | 1.5 | 0.3 | 0.2 | 14.0 (10.69) |
| Example 4 | 100 | 15 | 1.5 | 0.3 | 0.2 | 18.6 (13.72) |
| Example 5 | 100 | 15 | 1.5 | 0.3 | 0.2 | 37.3 (24.17) |
| Example 6 | 100 | 15 | 1.5 | 0.3 | 0.2 | 3.0 (2.5) |
| Example 7 | 100 | 15 | 1.5 | 0.3 | 0.2 | 7.0 (5.65) |
| Example 8 | 100 | 15 | 1.5 | 0.3 | 0.2 | 21.0 (15.22) |
| Comparative Example 1 | 100 | 0 | 0 | 0.3 | 0.2 | 3.0 (2.90) |
| Comparative Example 2 | 100 | 0 | 0 | 0.3 | 0.2 | 7.0 (6.51) |
| Comparative Example 3 | 100 | 0 | 0 | 0.3 | 0.2 | 21.0 (17.28) |

Remarks:
1) Acrylic base copolymer: a copolymer having a weight-average molecular weight of 1,800,000 which is obtained by polymerizing butyl acrylate and acrylic acid in a mass ratio of 95:5 according to a conventional method
2) Multifunctional acrylic base monomer: tris(acryloxyethyl) isocyanurate, molecular weight=423, trifunctional type (trade name: "Aronix M-315", manufactured by TOAGOSEI CO., LTD.)
3) Photopolymerization initiator: mixture of benzophenone and 1-hydroxycyclohexyl phenyl ketone in a mass ratio of 1:1, "Irgacure 500", manufactured by Ciba Specialty Chemicals Co., Ltd.
4) Isocyanate base cross-linking agent: trimethylolpropane-modified tolylenediisocyanate ("Coronate L", manufactured by NIPPON POLYURETHANE INDUSTRY CO., LTD.)
5) Silane coupling agent: 3-glycidoxypropyltrimethoxysilane ("KBM-403", manufactured by Shin-Etsu Chemical Co., Ltd.)
6) Silicone beads: spherical silicone fine particles ("Tospearl 145", average particle diameter: 4.5 μm, manufactured by GE Toshiba Silcones Co., Ltd.)

TABLE 2

| | Performances of pressure-sensitive adhesive | | | | | Performance of polarizing plate with pressure-sensitive adhesive | | | | Performance of pressure-sensitive adhesive sheet Parting-in-tears generating rate (%) | |
|---|---|---|---|---|---|---|---|---|---|---|---|
| | Storage elastic modulus (MPa) | | Adhesive strength To non-alkali glass | Haze value (%) | Gel ratio (%) | Holding power (μm) | Durability | | | | Peeling speed 10 m/min | Peeling speed 30 m/min |
| | 23° C. | 80° C. | | | | | 90° C. | 80° C. | 60° C. 90% RH | Heat shock | | |
| Example 1 | 0.945 | 0.458 | 37.5 | 37.9 | 98.3 | 53.0 | ○ | ○ | ○ | ○ | 0 | 0 |
| Example 2 | 0.998 | 0.495 | 35.5 | 58.7 | 98.6 | 48.0 | ○ | ○ | ○ | ○ | 0 | 0 |
| Example 3 | 1.050 | 0.530 | 29.8 | 70.4 | 99.2 | 48.0 | ○ | ○ | ○ | ○ | 0 | 0 |
| Example 4 | 1.130 | 0.578 | 29.0 | 78.5 | 98.9 | 35.0 | ○ | ○ | ○ | ○ | 0 | 0 |
| Example 5 | 1.370 | 0.707 | 24.0 | 89.2 | 98.4 | 36.5 | ○ | ○ | ○ | ○ | 0 | 0 |
| Example 6 | 1.010 | 0.480 | 19.0 | 23.9 | 96.6 | 54.5 | ○ | ○ | ○ | ○ | 0 | 0 |
| Example 7 | 0.890 | 0.460 | 16.5 | 43.9 | 96.9 | 52.0 | ○ | ○ | ○ | ○ | 0 | 0 |
| Example 8 | 1.010 | 0.490 | 14.0 | 75.0 | 98.3 | 37.5 | ○ | ○ | ○ | ○ | 0 | 0 |
| Comparative Example 1 | 0.140 | 0.090 | 12.5[7] | 25.8 | 0.4 | >25000 | ○ | ○ | X | X | 0 | 0 |
| Comparative Example 2 | 0.140 | 0.090 | 13.0[7] | 47.0 | 0.3 | >25000 | ○ | ○ | X | X | 10 | 10 |
| Comparative Example 3 | 0.200 | 0.120 | 10.5 | 75.6 | 0.0 | >25000 | X | ○ | X | X | 20 | 20 |

[7]Remained adhesive is observed.

INDUSTRIAL APPLICABILITY

According to the pressure-sensitive adhesive of the present invention for applying an optically functional film, adhesion can be carried out with good durability in adhesion of an optically functional film, to be more specific, adhesion of a polarizing plate, particularly a polarizing plate integrated with a viewing angle expanding film and the like with a liquid crystal cell, adhesion of a polarizing plate with a retardation film, adhesion of a retardation film with a retardation film and adhesion of a retardation film with a liquid crystal cell, and even brightness can be obtained without causing an uneven luminance in a liquid crystal display. Further, bubbles are not produced in a pressure-sensitive adhesive layer even after time passes, and an uneven luminance is not brought about. Accordingly, use of the pressure-sensitive adhesive of the present invention makes it possible to maintain even brightness over a long period of time without causing an uneven luminance in a liquid crystal display. Further, a pressure-sensitive adhesive sheet in which the pressure-sensitive adhesive of the present invention is interposed between two release sheets does not cause "parting" and is excellent in an applying workability of an optically functional film.

What is claimed is:

1. A pressure-sensitive adhesive comprising a pressure-sensitive adhesive material prepared by irradiating with an active energy beam a pressure-sensitive adhesive resin comprising (A) an acrylic copolymer and (B) an active energy beam-curable compound, wherein said pressure sensitive adhesive resin comprises fine particles having an average particle diameter of 0.1 to 20 μm dispersed therein, wherein:
the pressure-sensitive adhesive has a storage elastic modulus (G') at 23° C. of 0.3 to 15 MPa, and a haze value of 5% or more,
a content ratio of component (A) to component (B) is 100:10 to 100:40 in terms of a mass ratio, and
the active energy beam-curable compound is a multifunctional (meth)acrylate base monomer having a molecular weight of less than 1000 and having a cyclic structure.

2. The pressure-sensitive adhesive as described in claim 1, wherein the storage elastic modulus (G') of the pressure-sensitive adhesive at 80° C. is 0.3 MPa or more.

3. The pressure-sensitive adhesive as described in claim 2, wherein the storage elastic modulus (G') at 80° C. is 0.3 to 10 MPa.

4. The pressure-sensitive adhesive as described in claim 1, wherein the pressure-sensitive adhesive has a gel ratio of 60% or more.

5. The pressure-sensitive adhesive as described in claim 1, located in-between and in contact with a polarizing plate and a liquid crystal glass cell, a polarizing plate and a retardation film, a retardation film and another retardation film or a retardation film and a liquid crystal glass cell.

6. The pressure-sensitive adhesive as described in claim 1, wherein the multifunctional (meth)acrylate base monomer is selected from the group consisting of di(acryloxyethyl) isocyanurate, tris(acryloxyethyl) isocyanurate, dimethyloldicyclopentane diacrylate, ethylene oxide-modified hexahydrophthalic acid diacrylate, tricyclodecanedimethanol acrylate and adamantane diacrylate.

7. The pressure-sensitive adhesive as described in claim 6, wherein the multifunctional (meth)acrylate base monomer has an isocyanurate structure.

8. The pressure-sensitive adhesive as described in claim 1, wherein the pressure-sensitive adhesive further comprises a cross-linking agent as a component (C).

9. The pressure-sensitive adhesive as described in claim 1, wherein the pressure-sensitive adhesive further comprises a silane coupling agent as a component (D).

10. The pressure-sensitive adhesive as described in claim 5, wherein the polarizing plate comprises a polarizing film integrated with a viewing angle expanding film.

11. The pressure-sensitive adhesive as described in claim 1, wherein the pressure-sensitive adhesive has an adhesive strength to non-alkali glass of 0.2 N/25 mm or more.

12. The pressure-sensitive adhesive as described in claim 1, wherein the pressure-sensitive adhesive has a holding power at 80° C. that is 200 μm or less in terms of a displacement amount after 70000 seconds.

13. An optically functional film comprising, thereon, pressure-sensitive adhesive as described in claim 1.

14. A production process for the optically functional film as described in claim 13, comprising applying an optically functional film on a pressure-sensitive adhesive material layer provided on a release layer of a release sheet and then irradiating a release sheet side with an active energy beam.

15. A pressure-sensitive adhesive sheet comprising the pressure-sensitive adhesive as described in claim 1 between two release sheets arranged so that the pressure-sensitive adhesive is in contact with release layer sides of the release sheets.

16. A process comprising applying a polarizing plate on a retardation film with the pressure-sensitive adhesive sheet as described in claim 15.

17. The pressure-sensitive adhesive as claimed in claim 1, wherein the fine particles have an average particle diameter of 0.5 to 10 μm, and wherein the pressure-sensitive adhesive has a storage elastic modulus (G') at 23° C. of 0.5 to 5 MPa, a haze value of 20 to 90%, and a storage elastic modulus (G') at 80° C. of 0.4 to 3 MPa.

18. The pressure-sensitive adhesive as described in claim 1, wherein said fine particles are present in an amount of 1 to 40 mass %.

19. The pressure-sensitive adhesive as described in claim 1, wherein said fine particles are selected from inorganic white pigments, organic transparent pigments, and organic white pigments.

20. The pressure-sensitive adhesive as described in claim 1, wherein said pressure-sensitive adhesive further comprises a photopolymerization initiator.

21. The pressure-sensitive adhesive as described in claim 20, wherein said photopolymerization initiator is present in an amount of 0.2 to 20 mass parts per 100 parts of component (B).

22. The pressure-sensitive adhesive as described in claim 11, wherein the pressure-sensitive adhesive has an adhesive strength to non-alkali glass of 1.0 to 50 N/25 mm.

23. The pressure-sensitive adhesive as claimed in claim 1, wherein the fine particles have an average particle diameter of 1 to 10 μm.

\* \* \* \* \*